(12) United States Patent
VanDuyn

(10) Patent No.: US 12,248,674 B2
(45) Date of Patent: *Mar. 11, 2025

(54) SYSTEMS AND METHODS FOR PRESENTING SCROLLING ONLINE CONTENT ON MOBILE DEVICES

(71) Applicant: GOOGLE LLC, Mountain View, CA (US)

(72) Inventor: Issac Sterling VanDuyn, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,139

(22) Filed: Nov. 20, 2023

(65) Prior Publication Data

US 2024/0086057 A1 Mar. 14, 2024

Related U.S. Application Data

(63) Continuation of application No. 17/138,231, filed on Dec. 30, 2020, now Pat. No. 11,836,340, which is a
(Continued)

(51) Int. Cl.
*G06F 17/00* (2019.01)
*G06F 3/01* (2006.01)
(Continued)

(52) U.S. Cl.
CPC ............ *G06F 3/0485* (2013.01); *G06F 3/016* (2013.01); *G06F 3/04842* (2013.01)

(58) Field of Classification Search
CPC ..... G06F 3/0485; G06F 3/016; G06F 3/04842
See application file for complete search history.

(56) References Cited

U.S. PATENT DOCUMENTS

| 5,038,138 A | 8/1991 | Akiyama et al. |
| 5,196,838 A | 3/1993 | Meier et al. |

(Continued)

FOREIGN PATENT DOCUMENTS

| CN | 103336646 A | * 10/2013 | ........... G06F 3/0484 |
| CN | 104156409 A | * 11/2014 | ......... G06F 16/9535 |

(Continued)

OTHER PUBLICATIONS

Final Office Action for U.S. Appl. No. 14/528,743 dated Apr. 13, 2017 (22 pages).
(Continued)

*Primary Examiner* — Laurie A Ries
(74) *Attorney, Agent, or Firm* — MARSHALL, GERSTEIN & BORUN LLP

(57) ABSTRACT

A computer-implemented method for providing dynamically scrolling content within a vertically scrolling online publication is implemented by a content serving computing device in communication with a memory. The method includes retrieving a dynamically scrolling content item, receiving a set of display information related to a user computing device, and serving the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

20 Claims, 7 Drawing Sheets

Related U.S. Application Data continuation of application No. 16/823,023, filed on Mar. 18, 2020, now abandoned, which is a continuation of application No. 14/528,743, filed on Oct. 30, 2014, now abandoned.

(51) Int. Cl.
  *G06F 3/04842*   (2022.01)
  *G06F 3/0485*   (2022.01)

(56) References Cited

U.S. PATENT DOCUMENTS

| | | |
|---|---|---|
| 5,200,738 A | 4/1993 | Fumoto et al. |
| 5,485,174 A | 1/1996 | Henshaw et al. |
| 5,528,260 A | 6/1996 | Kent |
| 5,740,549 A | 4/1998 | Reilly et al. |
| 5,864,330 A | 1/1999 | Haynes |
| 5,867,208 A | 2/1999 | McLaren |
| 6,084,598 A | 7/2000 | Chekerylla |
| 6,161,112 A | 12/2000 | Cragun et al. |
| 6,188,398 B1 | 2/2001 | Collins-Rector et al. |
| 6,690,391 B1 | 2/2004 | Proehl et al. |
| 6,727,930 B2 | 4/2004 | Currans et al. |
| 6,910,191 B2 | 6/2005 | Segerberg et al. |
| 6,961,908 B2 | 11/2005 | Phillips |
| 7,038,664 B2 | 5/2006 | Danzyger et al. |
| 7,071,919 B2 | 7/2006 | Hinckley et al. |
| 7,079,160 B2 | 7/2006 | Colavin |
| 7,154,513 B2 | 12/2006 | Nishiyama |
| 7,266,835 B2 | 9/2007 | Halbert |
| 7,308,653 B2 | 12/2007 | Lin-Hendel |
| 7,441,207 B2 | 10/2008 | Filner et al. |
| 7,487,444 B2 | 2/2009 | Lira |
| 7,634,789 B2 | 12/2009 | Gerba et al. |
| 7,765,470 B2 | 7/2010 | Epstein |
| 7,786,975 B2 | 8/2010 | Ording et al. |
| 7,818,688 B2 | 10/2010 | Narita et al. |
| 7,844,915 B2 | 11/2010 | Platzer et al. |
| 7,856,602 B2 | 12/2010 | Armstrong |
| 7,873,725 B2 | 1/2011 | Westphal |
| 7,911,451 B2 | 3/2011 | Byun et al. |
| 8,042,063 B1 | 10/2011 | Lin-Hendel |
| 8,108,788 B2 | 1/2012 | Tornqvist et al. |
| 8,108,792 B2 | 1/2012 | Lin-Hendel |
| 8,229,911 B2 | 7/2012 | Bennett |
| 8,245,256 B2 | 8/2012 | Murthy et al. |
| 8,327,275 B2 | 12/2012 | Espinoza et al. |
| 8,423,901 B2 | 4/2013 | D'Entremont et al. |
| 8,490,134 B2 | 7/2013 | Gerba et al. |
| 8,503,995 B2 | 8/2013 | Ramer et al. |
| 8,555,184 B2 | 10/2013 | Hong et al. |
| 8,578,416 B1 | 11/2013 | Radloff et al. |
| 8,589,253 B2 | 11/2013 | Rothman |
| 8,606,652 B2 | 12/2013 | Gonsalves et al. |
| 8,631,356 B2 | 1/2014 | Lai et al. |
| 8,650,089 B2 * | 2/2014 | Laster-Fields ......... G06Q 30/02 705/26.1 |
| 8,654,099 B2 | 2/2014 | Campbell et al. |
| 8,732,757 B2 | 5/2014 | Ward et al. |
| 8,756,121 B2 | 6/2014 | Gonsalves et al. |
| 8,756,494 B2 | 6/2014 | Bell et al. |
| 8,788,963 B2 | 7/2014 | McCommons et al. |
| 8,812,996 B1 | 8/2014 | Shah et al. |
| 9,013,513 B2 | 4/2015 | Paolini et al. |
| 9,021,386 B1 | 4/2015 | Rasmussen et al. |
| 9,041,744 B2 | 5/2015 | Barcklay et al. |
| 9,086,756 B2 | 7/2015 | Schon et al. |
| 9,087,337 B2 | 7/2015 | Ho et al. |
| 9,152,312 B1 | 10/2015 | Terleski et al. |
| 9,164,670 B2 | 10/2015 | Lobo et al. |
| 9,208,500 B2 | 12/2015 | Brown et al. |
| 9,286,622 B2 | 3/2016 | Choi |
| 9,294,823 B2 | 3/2016 | Gerba et al. |
| 9,473,560 B1 * | 10/2016 | Liu ................. H04L 67/62 |
| 9,473,729 B2 | 10/2016 | Miles et al. |
| 9,535,889 B2 | 1/2017 | De Jager et al. |
| 9,552,439 B1 | 1/2017 | Krecichwost et al. |
| 9,552,440 B1 | 1/2017 | Krecichwost et al. |
| 9,582,813 B2 | 2/2017 | Greenberg et al. |
| 9,658,758 B1 | 5/2017 | Krecichwost et al. |
| 9,773,073 B1 | 9/2017 | Krecichwost et al. |
| 9,851,864 B2 | 12/2017 | Lira |
| 9,965,162 B2 | 5/2018 | Hauser et al. |
| 10,191,643 B2 | 1/2019 | Hauser et al. |
| 10,467,657 B2 * | 11/2019 | Karande ............ G06Q 30/0275 |
| 10,692,531 B2 | 6/2020 | Doherty et al. |
| 2001/0056370 A1 | 12/2001 | Tafla |
| 2002/0030667 A1 | 3/2002 | Hinckley et al. |
| 2002/0032603 A1 | 3/2002 | Yeiser |
| 2002/0054043 A1 | 5/2002 | Nishiyama |
| 2002/0097264 A1 | 7/2002 | Dutta et al. |
| 2002/0138834 A1 | 9/2002 | Gerba |
| 2003/0020758 A1 | 1/2003 | Hinderks |
| 2003/0043174 A1 | 3/2003 | Hinckley |
| 2003/0182628 A1 | 9/2003 | Lira |
| 2004/0150630 A1 | 8/2004 | Hinckley et al. |
| 2004/0205504 A1 | 10/2004 | Phillips |
| 2004/0207648 A1 | 10/2004 | Cox et al. |
| 2005/0001848 A1 | 1/2005 | Colavin |
| 2006/0020548 A1 | 1/2006 | Flather |
| 2006/0164399 A1 | 7/2006 | Cheston et al. |
| 2006/0242603 A1 | 10/2006 | Wong et al. |
| 2008/0015929 A1 | 1/2008 | Koeppel et al. |
| 2008/0148177 A1 | 6/2008 | Lang et al. |
| 2008/0168384 A1 | 7/2008 | Platzer et al. |
| 2008/0201311 A1 | 8/2008 | Ertugrul et al. |
| 2008/0220747 A1 | 9/2008 | Ashkenazi et al. |
| 2008/0270886 A1 | 10/2008 | Gossweiler et al. |
| 2009/0049406 A1 | 2/2009 | Epstein et al. |
| 2009/0144607 A1 | 6/2009 | Chen |
| 2009/0144661 A1 | 6/2009 | Nakajima et al. |
| 2009/0158204 A1 | 6/2009 | Rocha |
| 2009/0164315 A1 | 6/2009 | Rothman |
| 2009/0210791 A1 | 8/2009 | Proehl et al. |
| 2009/0222552 A1 | 9/2009 | Chroscielewski et al. |
| 2009/0265243 A1 | 10/2009 | Karassner et al. |
| 2009/0292609 A1 | 11/2009 | Vaidyanathan |
| 2010/0066688 A1 | 3/2010 | Jeon |
| 2010/0095239 A1 | 4/2010 | McCommons et al. |
| 2010/0122287 A1 | 5/2010 | Beyabani et al. |
| 2010/0198697 A1 | 8/2010 | Brown et al. |
| 2010/0269038 A1 | 10/2010 | Tsuda |
| 2010/0281421 A1 | 11/2010 | Lin-Hendel et al. |
| 2011/0016391 A1 | 1/2011 | Borovsky et al. |
| 2011/0083082 A1 | 4/2011 | Gottwald et al. |
| 2011/0083096 A1 | 4/2011 | Armstrong |
| 2011/0093897 A1 | 4/2011 | Gerba et al. |
| 2011/0119714 A1 | 5/2011 | Murthy et al. |
| 2011/0125594 A1 | 5/2011 | Brown et al. |
| 2011/0145883 A1 | 6/2011 | Godar et al. |
| 2011/0179451 A1 | 7/2011 | Miles et al. |
| 2011/0225540 A1 | 9/2011 | D'Entremont et al. |
| 2012/0022926 A1 | 1/2012 | Ramanathan |
| 2012/0023457 A1 | 1/2012 | Lai et al. |
| 2012/0030629 A1 | 2/2012 | Kujda et al. |
| 2012/0054606 A1 | 3/2012 | Terayoko |
| 2012/0062604 A1 | 3/2012 | Lobo et al. |
| 2012/0066638 A1 | 3/2012 | Ohri et al. |
| 2012/0084144 A1 | 4/2012 | Shim |
| 2012/0095881 A1 | 4/2012 | Rothman et al. |
| 2012/0131441 A1 | 5/2012 | Jitkoff et al. |
| 2012/0290402 A1 | 11/2012 | Rothman et al. |
| 2012/0310751 A1 | 12/2012 | Kim |
| 2013/0054972 A1 | 2/2013 | Thorwirth et al. |
| 2013/0106744 A1 | 5/2013 | Asakura |
| 2013/0117129 A1 | 5/2013 | Brown et al. |
| 2013/0151987 A1 | 6/2013 | Flynn et al. |
| 2013/0185628 A1 | 7/2013 | Lira |
| 2013/0185676 A1 | 7/2013 | Cao |
| 2013/0226710 A1 | 8/2013 | Plut |
| 2013/0238433 A1 | 9/2013 | Kamdar |
| 2013/0238973 A1 | 9/2013 | Chang |
| 2013/0246165 A1 | 9/2013 | Choi |
| 2013/0305288 A1 | 11/2013 | Gerba et al. |

(56) References Cited

U.S. PATENT DOCUMENTS

| | | |
|---|---|---|
| 2013/0339830 A1 | 12/2013 | Yuan et al. |
| 2013/0339905 A1 | 12/2013 | Liu et al. |
| 2013/0346914 A1 | 12/2013 | Jeong |
| 2014/0019232 A1 | 1/2014 | Vee et al. |
| 2014/0071074 A1 | 3/2014 | Cousins et al. |
| 2014/0101582 A1 | 4/2014 | Bamford et al. |
| 2014/0143715 A1 | 5/2014 | Kim |
| 2014/0149922 A1 | 5/2014 | Hauser et al. |
| 2014/0188616 A1 | 7/2014 | Badenhop |
| 2014/0208271 A1 | 7/2014 | Bell et al. |
| 2014/0223292 A1 | 8/2014 | Sakuta et al. |
| 2014/0244407 A1 | 8/2014 | Brown et al. |
| 2014/0245221 A1 | 8/2014 | Dougherty et al. |
| 2014/0258834 A1 | 9/2014 | Brown |
| 2014/0279025 A1 | 9/2014 | Klanjsek et al. |
| 2014/0365318 A1 | 12/2014 | Karande et al. |
| 2014/0365890 A1 | 12/2014 | Lei et al. |
| 2015/0012352 A1 | 1/2015 | Kanter et al. |
| 2015/0020021 A1 | 1/2015 | Marr et al. |
| 2015/0029093 A1* | 1/2015 | Feinstein ............... G01B 21/22 345/156 |
| 2015/0074599 A1* | 3/2015 | Stein ................. H04N 21/4821 715/810 |
| 2015/0143282 A1 | 5/2015 | Telang et al. |
| 2015/0199082 A1* | 7/2015 | Scholler ............... G06F 3/0485 715/830 |
| 2015/0242110 A1 | 8/2015 | Balakrishnan et al. |
| 2016/0034976 A1 | 2/2016 | Dayanand et al. |
| 2016/0055129 A1* | 2/2016 | Kan ....................... H04L 67/01 715/249 |
| 2016/0070463 A1 | 3/2016 | Lobo et al. |
| 2016/0299654 A1 | 10/2016 | Mai et al. |
| 2016/0381426 A1 | 12/2016 | Miles et al. |
| 2017/0026324 A1 | 1/2017 | Adkins et al. |
| 2017/0026328 A1 | 1/2017 | Adkins et al. |
| 2017/0148091 A1 | 5/2017 | Lin-Hendel |
| 2017/0154014 A1 | 6/2017 | Arnold et al. |
| 2017/0201478 A1 | 7/2017 | Joyce et al. |
| 2017/0206563 A1 | 7/2017 | Choi |
| 2017/0220220 A1 | 8/2017 | Suzuki |
| 2017/0344339 A1 | 11/2017 | Molesky et al. |
| 2018/0130097 A1 | 5/2018 | Tran et al. |
| 2018/0150438 A1* | 5/2018 | Wang .................... G06F 40/109 |
| 2018/0197575 A1 | 7/2018 | Doherty et al. |

FOREIGN PATENT DOCUMENTS

| | | | |
|---|---|---|---|
| WO | WO-2013101472 A1 * | 7/2013 | ............. G06F 3/016 |
| WO | WO-2014131030 A1 * | 8/2014 | ........... G06F 3/0483 |

OTHER PUBLICATIONS

Final Office Action for U.S. Appl. No. 14/528,743 dated Jun. 5, 2018 (33 pages).

Final Office Action for U.S. Appl. No. 16/823,023 dated Dec. 30, 2020 (28 pages).

Non-Final Office Action for U.S. Appl. No. 14/528,743 dated Jan. 12, 2018 (24 pages).

Non-Final Office Action for U.S. Appl. No. 14/528,743 dated Nov. 16, 2016 (18 pages).

Non-Final Office Action for U.S. Appl. No. 16/823,023 dated Jul. 15, 2020 (22 pages).

Non-Final Office Action for U.S. Appl. No. 16/823,023 dated Sep. 10, 2020 (18 pages).

\* cited by examiner

SYSTEMS AND METHODS FOR PRESENTING SCROLLING ONLINE CONTENT ON MOBILE DEVICES

CROSS-REFERENCE TO RELATED APPLICATIONS

This application is a continuation of U.S. patent application Ser. No. 17/138,231, filed Dec. 30, 2020, which is a continuation of U.S. patent application Ser. No. 16/823,023, filed Mar. 8, 2020, which is a continuation of U.S. patent application Ser. No. 14/528,743, filed Oct. 30, 2014, all of which are hereby incorporated by reference in their entireties.

BACKGROUND

This description relates to online content, and more particularly, to methods and systems for presenting horizontally scrolling online content in conjunction with vertically scrolling online publications on mobile computing devices.

At least some online content (i.e., advertising content presented to consumers with online publications or online applications) is associated with an online content provider such as an online advertiser. At least some such online content may be presented to a mobile computing device including, for example, a smartphone computing device, a tablet computing device, and a phablet computing device (i.e., a hybrid of smartphone and tablet).

At least some online publications served to mobile computing devices may be displayed in a vertical scrolling format. For example, individual online publications or a plurality of online publications may be served to an application or browser that displays online publications in a scrollable vertical display such that a user may navigate within the online publication or online publications by scrolling up or down. In many examples, the user may make haptic gestures to control the speed and direction of scrolling. Such haptic gestures may include, for example, haptic taps and haptic swipes.

In many examples, online content may be served within or alongside online publications. However, in such a vertical scrolling format, online content (such as an online advertisement) that is presented within the online publication or online publications may be difficult to view and interact with. For example, if the online content is presented interstitially within the online publication, an online user may inadvertently scroll past the online content without viewing the online content. Alternately, the online user may inadvertently select the online content unintentionally because of the placement of the online content. Accordingly, improved methods of providing online content within vertically scrolling online publications are desirable.

SUMMARY

In one aspect, a computer-implemented method for providing dynamically scrolling content within a vertically scrolling online publication is provided. The method is implemented by a content serving computing device in communication with a memory. The method includes retrieving a dynamically scrolling content item, receiving a set of display information related to a user computing device, and serving the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

In another aspect, a content serving computing device for providing dynamically scrolling content within a vertically scrolling online publication is provided. The content serving computing device includes a memory for storing data and a processor in communication with the memory. The processor is configured to retrieve a dynamically scrolling content item, receive a set of display information related to a user computing device, and serve the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

In another aspect, a computer-readable storage device having processor-executable instructions embodied thereon, for providing dynamically scrolling content within a vertically scrolling online publication is provided. When executed by a computing device, the processor-executable instructions cause the computing device to retrieve a dynamically scrolling content item, receive a set of display information related to a user computing device, and serve the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

In another aspect, a computer-implemented method for displaying dynamically scrolling content within a vertically scrolling online publication is provided. The method is implemented by a user computing device in communication with a memory. The method includes receiving a first online publication configured to display in a vertically scrolling format, wherein the first online publication includes at least one slot for serving online content, wherein the first online publication is configured to be navigated based on a first haptic input with the user computing device, presenting a dynamically scrolling content item within the at least one slot, receiving the first haptic input at the first online publication, and scrolling vertically through the first online publication and horizontally through the dynamically scrolling content item based on the first haptic input.

In another aspect, a system for providing dynamically scrolling content within a vertically scrolling online publication is provided. The system includes means for retrieving a dynamically scrolling content item, means for receiving a set of display information related to a user computing device, and means for serving the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

In another aspect, the system described above is provided, wherein the system further includes means for adjusting the dynamically scrolling content item based on the set of display information, and means for serving the adjusted dynamically scrolling content item within the slot of the vertically scrolling online publication.

In another aspect, the system described above is provided, wherein the system further includes means for configuring the dynamically scrolling content item to receive the first haptic input from the user computing device such that the first haptic input causes the dynamically scrolling content item to scroll perpendicularly to the motion of the first haptic input.

In another aspect, the system described above is provided, wherein the system further includes means for configuring the dynamically scrolling content item to receive the first haptic input from the user computing device such that the first haptic input causes the dynamically scrolling content item to scroll in a rate corresponding to the rate of scrolling of the first online publication.

In another aspect, the system described above is provided, wherein the system further includes means for serving the dynamically scrolling content item within the slot of the vertically scrolling online publication such that the dynamically scrolling content item is displayed extending beyond a horizontal border of the vertically scrolling publication.

In another aspect, the system described above is provided, wherein the system further includes means for serving the dynamically scrolling content item within the slot of the vertically scrolling online publication such that the slot remains in a fixed location on the user computing device.

In another aspect, the system described above is provided, wherein the system further includes means for retrieving the dynamically scrolling content item including at least two visual content elements and means for serving the at least two visual content elements within the slot of the vertically scrolling online publication.

The features, functions, and advantages described herein may be achieved independently in various embodiments of the present disclosure or may be combined in yet other embodiments, further details of which may be seen with reference to the following description and drawings.

Figure 1:
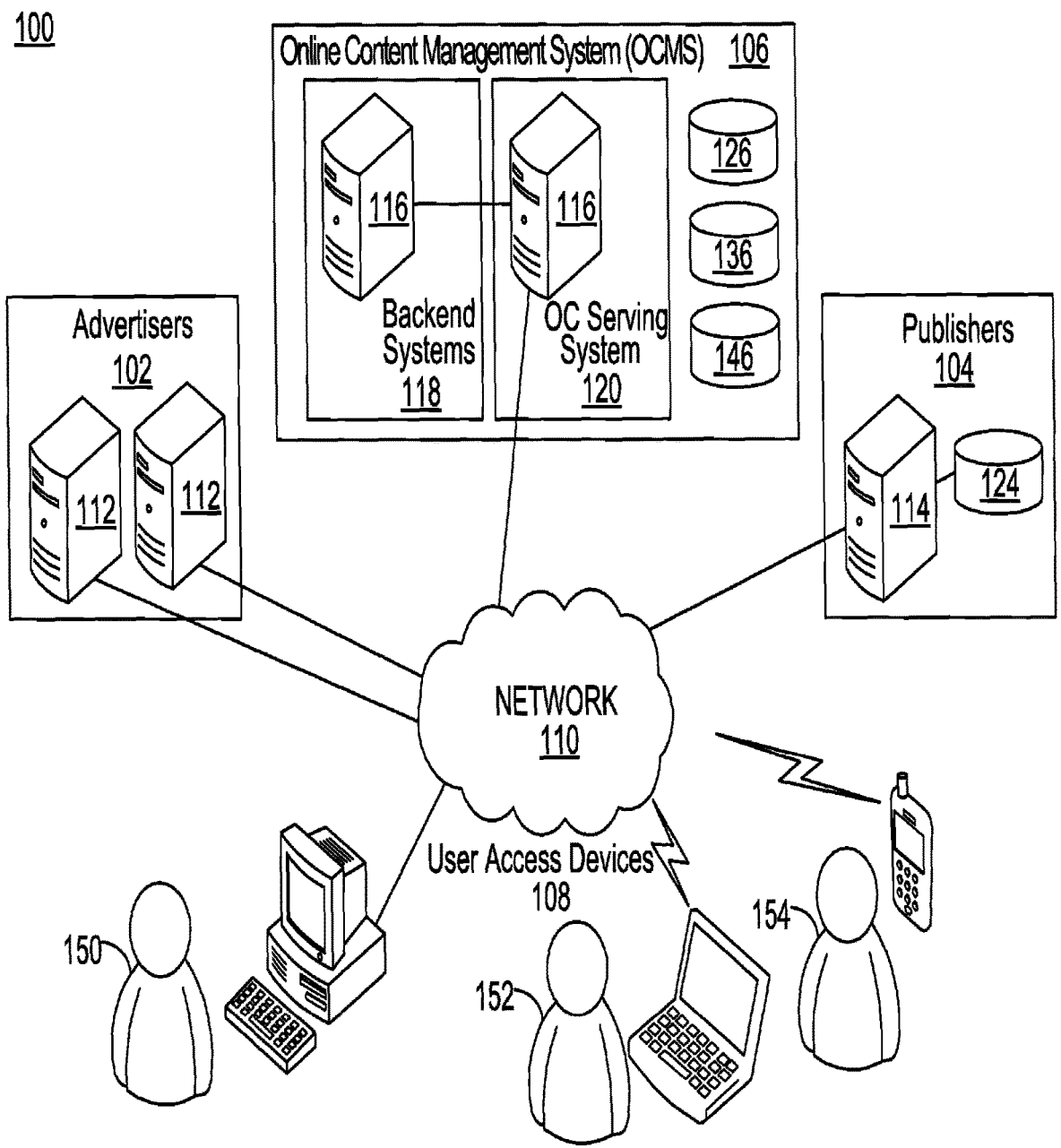
FIG. 1 is a diagram depicting an example online content environment.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description of implementations refers to the accompanying drawings. The same reference numbers in different drawings may identify the same or similar elements. Also, the following detailed description does not limit the claims.

The subject matter described herein relates generally to online content, and more particularly, to methods and systems for presenting and displaying horizontally scrolling online content in conjunction with vertically scrolling online publications on mobile computing devices.

The system described herein is configured to improve online content (e.g., advertisements) provided to online users (e.g., consumers) by presenting and displaying such online content using a scrolling display that scrolls the online content perpendicularly to the scrolling of an online publication, as described below.

At least some online content (i.e., advertising content presented to consumers with online publications or online applications) is associated with an online content provider such as an online advertiser. At least some such online content may be presented to a user computing device such as a mobile computing device. Mobile computing devices may include, for example, a smartphone computing device, a tablet computing device, and a phablet computing device (i.e., a hybrid of smartphone and tablet).

At least some online publications served to mobile computing devices may be displayed in a vertical scrolling format. For example, individual online publications or a plurality of online publications may be served to an application or browser that displays online publications in a scrollable vertical display such that a user may navigate within the online publication or online publications by scrolling up or down. In many examples, the user may make haptic gestures to control the speed and direction of scrolling. Such haptic gestures may include, for example, haptic taps and haptic swipes that are inputted or applied to the user interface (or display screen) of the mobile computing device (or user computing device) to cause the displayed data to scroll in a particular direction.

In many examples, online content may be served within or alongside online publications. However, in such a vertical scrolling format, online content (such as an online advertisement) that is presented within the online publication or online publications may be difficult to view and interact with. For example, if the online content is presented interstitially within the online publication, an online user may inadvertently scroll past the online content without viewing the online content. Alternately, the online user may inadvertently select the online content unintentionally because of the placement of the online content.

The systems and methods described herein are configured to provide online content within vertically scrolling online publications such that the online content is viewable and configured for user interaction. In a first example embodiment, a content serving computing device is configured to provide such online content to a user computing device. In such an embodiment, the content serving computing device is configured to: (a) retrieve a dynamically scrolling content item; (b) receive a set of display information related to a user computing device; and (c) serve the dynamically scrolling content item within a slot of a vertically scrolling online publication presented at the user computing device, wherein the dynamically scrolling content item is served based partially on the set of display information, and wherein the dynamically scrolling content item is configured to scroll horizontally in response to a first haptic input received by a user of the user computing device In a second example embodiment, a user computing device is configured to display online content within a vertically scrolling online publication such that the online content is viewable and configured for user interaction. In such an embodiment, the user computing device is configured to: (a) receive a first online publication configured to display in a vertically scrolling format, wherein the first online publication includes at least one slot for serving online content, and wherein the first online publication is configured to be navigated based on a first haptic input with the user computing device; (b) present a dynamically scrolling content item within the at least one slot; (c) receive the first haptic input at the first online publication; and (d) scroll vertically through the first online publication and horizontally through the dynamically scrolling content item based on the first haptic input when the dynamically scrolling content is displayed on the user computing device.

In the example embodiment, the content serving computing device retrieves a dynamically scrolling content item. As described herein, "dynamically scrolling content item" refers to online content such as an advertisement that may be presented to an online user in conjunction with an online publication. The dynamically scrolling content item may also be referred to as an online content item. The dynamically scrolling content item includes at least one element (e.g., an advertising creative). In the example embodiment, the at least one element may be referred to as a "graphical element" and may include text, images, animation, and element annotations. Although some dynamically scrolling content items may include one graphical element, in the example embodiment, the dynamically scrolling content may also include multiple graphical elements. Graphical elements may also be referred to as "content elements." In at least some examples, graphical elements may include screenshots, advertising images, still images of videos, interactive video elements (i.e., a user may select the graphical element and cause a video to stream), and textual displays, calls-to-action, and links to access or purchase content associated with the graphical elements. Further, graphical elements may include presentation elements such as titles of the graphical element, names of products or services (e.g., the name of the product or service advertised), names of online content providers (e.g., the name of the company associated with the graphical element), and backgrounds. In at least some examples, graphical elements may also include annotations including star ratings, user reviews, popularity scores, prices, promotions, and discounts.

In the example embodiment, the content serving computing device may retrieve the dynamically scrolling content item from any suitable source including an advertising repository. In at least some examples, the dynamically scrolling content item may be retrieved as two individual graphical elements that are linked, concatenated, or otherwise associated by the content serving computing device. In other examples, the content serving computing device may retrieve references to the dynamically scrolling content item or graphical elements and use such references in display, as described herein.

In the example embodiment, a user computing device (e.g., a mobile computing device such as a smart phone, a tablet, or a phablet) may be used to navigate to an online publication. As used herein, an "online publication" may represent any suitable publication or information that a user may view on the user computing device. An online publication may include, for example, online newspapers, online magazines, and television websites. Further, an online publication may be displayed using an application (e.g., a mobile application) or a web browser (e.g., a mobile web browser). In the example embodiment, a user navigates to online publications at a newsfeed application which provides a plurality of news content that may be viewed and scrolled vertically. An online publication may include component elements that may be referred to as "publication elements." In some examples, particular publication elements (e.g., a news story) may be selected to expand the publication element (e.g., to expand the news story) or to interact with the publication element (e.g., provide comments).

As described below and herein, in the example embodiment, the online publications may be provided by online publishers ("publishers"). Publishers accordingly may receive requests from user devices and provide or present content to the requesting devices. The publishers may provide or present content via various mediums and in various forms, including web based forms (e.g., using a mobile web browser) and non-web based forms (e.g., using a mobile application). The publishers may generate and/or maintain content (e.g., online publications and publication elements) and/or retrieve the content from other network resources.

As described herein, at least some online publications may be presented on mobile devices using a scrolling navigation method. For example, in the newsfeed application described above, a user at the user computing device may scroll through the online publications (i.e., the newsfeed) to view publication elements (e.g., news stories) along an axis. As a user scrolls, new publication elements will appear in relation to the direction of scrolling. Users may scroll vertically or horizontally. In the example embodiment, a user may scroll vertically while a user computing device is in a "portrait" configuration (i.e., the longer sides of the user computing device are "up" relative to the user). In other examples, a user may scroll horizontally in such a portrait configuration. Similarly, although a user may scroll horizontally when a user computing device is in a "landscape" configuration (i.e., the longer sides of the user computing device are "up" relative to the user), a user may alternately scroll vertically in such a display. Such scrolling options may be controlled by the mobile application, the mobile web browser, the online publication, and/or settings of the user computing device.

As described herein, publishers may define "slots" within online publications for displaying online content such as the dynamically scrolling content item. Slots are open spaces within online publications (e.g., between two publication elements) that are available for displaying other information including online content (e.g., online advertisements). Publishers access or retrieve online content from online content servers. Publishers are configured to integrate or combine retrieved content with additional sets of content, for example the dynamically scrolling content item, that are related or relevant to the retrieved content for display to users. In the example embodiment, publishers are configured to provide the dynamically scrolling content item in slots within the scrolling online publications.

In the example embodiment, applications (e.g., mobile web browsers and other mobile applications) are configured to integrate or combine retrieved content (e.g., the dynamically scrolling content item) and the online publications when displaying such information at the user computing device (e.g., the mobile computing device). Such integration or combination may occur within such applications or using services available from the user computing device. In the example embodiment, applications provide such integration or combination by executing embedded code. In at least some example embodiments, such embedded code is provided to applications by the content serving computing device. In at least one such example, the embedded code may be provided in conjunction with serving the dynamically scrolling content item. Alternately, such embedded code may be provided prior to serving the dynamically scrolling content item (e.g., during the installation or upgrade of the application.) In further examples, some portions of integration or combination may be performed by any suitable system including, to example, the content serving computing device, the publisher, or any other related systems. For example, an application may be configured with code to allow certain interaction options available to the user computing device, and rules or responses to such interaction options. Such interaction options may identify the manner in which users may interact with online content and online publications. As described herein, the applications are configured to present the dynamically scrolling content such that a user may scroll perpendicularly to the axis of scrolling the online publication. In other words, the mobile application may allow a user to scroll an online publication vertically and accordingly present the dynamically scrolling content item in a "slot" such that the dynamically scrolling content item is scrolled horizontally. Alternately, the mobile application may allow a user to scroll an online publication horizontally and accordingly present the dynamically scrolling content item in a "slot" such that the dynamically scrolling content item is scrolled vertically.

The application (e.g., mobile web browsers and other mobile applications) is also configured to define responses to particular inputs. In the example embodiment, the application is configured such that a user computing device may receive a haptic input (e.g., a downward vertical swipe) and cause the application to scroll through the online publication. Alternately, the application may be configured such that any suitable input (including other haptic inputs) may cause the application to scroll through the online publication. In some examples, the speed or velocity of the input (e.g., the haptic input) may correlate to the speed of scrolling. For example, a faster downward vertical haptic swipe may cause the vertical scrolling of the online publication to occur more quickly.

In the example embodiment, the application is configured to cause an input to scroll the online publication to cause the scrolling of the dynamically scrolling content item. For example, when the user computing device receives an upward swipe the application is configured to scroll the online publication downwards (moving previously displayed portions of the online publication upwards) and to also scroll the dynamically scrolling content item. In the example embodiment, when the user computing device receives an upward swipe, the online publication is scrolled downwards and the dynamically scrolling content item is scrolled leftwards. Such scrolling may occur simultaneously when the dynamically scrolling content item is displayed on the user computing device. Accordingly, the application may be configured (based on the embedded code or any other suitable service) to provide such simultaneous scrolling at times when both the dynamically scrolling content item and the online publication are displayed or viewable. Alternately, any suitable relationship may be made between the scrolling of the online publication and the scrolling of the dynamically scrolling content item. For example, an upward swipe may cause the online publication to scroll downwards and the dynamically scrolling content item to scroll rightwards. Alternately, a downward swipe may cause the online publication to scroll upwards and the dynamically scrolling content to scroll rightwards. The application is also configured so that the speed or velocity of the input causes the dynamically scrolling content item to scroll at a rate proportional to the speed or velocity of the input.

In at least some examples, the speed of scrolling the online publication may be calibrated with respect to the speed of scrolling the dynamically scrolling content item. For example, the speed of scrolling the online publication may appear to be the same speed, twice the speed, or half the speed of scrolling the dynamically scrolling content item. Calibration of the relative speeds of scrolling may also factor in the relative sizes of the online publication, the dynamically scrolling content item, and the dimensions of the display of the user computing device. For example, if a horizontally scrolling dynamically scrolling content item is relatively long in comparison to the width of the user computing device (e.g., the dynamically scrolling content item is three times the width of the display of the user computing device), the application may be configured to scroll through the dynamically scrolling content item at a faster rate than a shorter dynamically scrolling content item (e.g., one that is only twice the width of the display of the user computing device.)

In the example embodiment, the dynamically scrolling content item includes content information (e.g., text, graphics, and animation) that may be rendered in a horizontal banner that extends across the display of a user computing device. In such an example embodiment, the dynamically scrolling content item may accordingly include enough graphical elements that the dynamically scrolling content item may extend beyond the physical horizontal boundaries of the user computing device and require user interaction to view the entirety of the dynamically scrolling content item. As described herein, the dynamically scrolling content item is accordingly served to and displayed on a user computing device to suggest that the dynamically scrolling content item "flows" beyond the horizontal borders of the user computing device. Such a "flow" may be indicated in a variety of manners. In one example, the first online publication may be served with borders (or margins) that offset the first online publication from the edges of the user computing device display. In such an example, the dynamically scrolling content item is not displayed to include such offsetting borders. The lack of borders may suggest to a user that there is mom content in the dynamically scrolling content item extending horizontally.

Because the dynamically scrolling content item is located in a "slot", as online publications are scrolled the slot may be moved onto or off of the screen of the user computing device. In at least some examples, the slot may be held in a fixed position such that online publications "pass" the dynamically scrolling content item. Accordingly, in such examples, the dynamically scrolling content item may persist on the screen.

In some examples, online publications may be displayed in complex views. For example, online publications may be displayed such that publication elements are represented in multiple columns ("multicolumns") that are parallel to one another. Multicolumn displays may be used where the width of a display is relatively large, such as in a landscape display or on a tablet computing device. In such examples, such multicolumn views may include slots that are wider than normal. Accordingly, in such multicolumn views, the scrolling of the dynamically scrolling content item through the slot may be decreased or removed entirely. However, the dynamically scrolling content item is still provided and displayed in row (e.g., in a horizontal display perpendicular to the scrolling of the multicolumn view).

In some examples, the dynamically scrolling content item may be configured to attract the attention of a user at the user computing device through motion. In one example, the dynamically scrolling content item may be configured to scroll even while no input to scroll the online publication has been received. For example, the dynamically scrolling content item may move slightly in one direction and then in the opposite. Such motion may allow a user to notice that the dynamically scrolling content item is distinct from the online publication. In other examples, the dynamically scrolling content item may be configured to shrink, expand, or otherwise animate to attract the attention of the user.

The content serving computing device also receives a set of display information related to a user computing device. As described herein, user computing devices may vary substantially in terms of physical, hardware, and software capabilities. Accordingly, the content serving computing device receives information related to the display of content on the user computing device. The content serving computing device uses the set of display information to appropriately scale, render, and serve the dynamically scrolling content item to the user computing device. In some examples, the user computing device may additionally be configured to alter or adjust the dynamically scrolling content item based on the display information of the user computing device. Similarly, as described herein, the content serving computing device (and the user computing device) may adjust (e.g., scale, render, and calibrate the response to inputs) the served dynamically scrolling content item based on information displayed on the user computing device such as the online publication.

As described herein, the dynamically scrolling content item is served within a first online publication that is displayed in a scrolling format (e.g., vertically or horizontally scrolling). The user computing device receives the first online publication. The first online publication may be received from a publication server, the content serving computing device, or any other suitable system. As described herein, the first online publication item is served based on received display information. For example, the display, size, formatting, and responses to inputs may be configured based upon the display information. The first online publication is configured to be scrolled (horizontally or vertically) based on user inputs. In the example embodiment, a user may use haptic inputs to navigate vertically through the first online publication. The first online publication includes at least one slot for serving online content.

The content serving computing device serves the dynamically scrolling content item to at least one of the slots of the first online publication served at the user computing device. The dynamically scrolling content item is served with a scrolling display that scrolls perpendicular relative to the scrolling of the first online publication. The dynamically scrolling content may be provided and scrolled beyond the horizontal or vertical dimensions of the user computing device display. Accordingly, a user may interact with the dynamically scrolling content item (e.g., by swiping horizontally) to view more information from the dynamically scrolling content item. Additionally, the dynamically scrolling content item is served so that a first haptic input (e.g., a haptic swipe, haptic tap, or other haptic gesture) with the first online publication also cause navigation of the dynamically scrolling content item. Specifically, vertical swipes of the first online publication may cause both a vertical scrolling of the first online publication and a horizontal scrolling of the dynamically scrolling content item. In the example embodiment, a downward swipe of the first online publication causes a downward scrolling of the first online publication and a rightward scrolling of the dynamically scrolling content item. Similarly, an upward swipe of the first online publication causes an upward scrolling of the first online publication and a leftward scrolling of the dynamically scrolling content item.

In at least some examples, the characteristics of the first haptic input may cause similar effects on both the first online publication and the dynamically scrolling content item. For example, the user computing device may be configured to detect a velocity associated with the first haptic input. Accordingly, the velocity of the first haptic input may be configured to similarly affect both the first online publication and the dynamically scrolling content item.

Further, as described herein, a user may separately interact with the dynamically scrolling content item (e.g., by scrolling the dynamically scrolling content item horizontally based on a horizontal haptic input received at or on the dynamically scrolling content item) to cause the dynamically scrolling content item to scroll independently of the online publication. In other words, although a haptic input received on the online publication may cause the online publication and the dynamically scrolling content item to scroll responsive to haptic input, a haptic input received on the dynamically scrolling content item alone may only cause the dynamically scrolling content item to scroll without causing the online publication to scroll.

The methods and systems described herein may be implemented using computer programming or engineering techniques including computer software, firmware, hardware or any combination or subset thereof, wherein the technical effects may be achieved by performing one of the following steps: (a) retrieving a dynamically scrolling content item; (b) receiving a set of display information related to a user computing device; (c) serving the dynamically scrolling content item within a slot of a vertically scrolling online publication presented at the user computing device, wherein the dynamically scrolling content item is served based partially on the set of display information, and wherein the dynamically scrolling content item is configured to scroll horizontally in response to a first haptic input received by a user of the user computing device; (d) adjusting the dynamically scrolling content item based on the set of display information; (e) serving the adjusted dynamically scrolling content item within the slot of the vertically scrolling online publication; (f) configuring the dynamically scrolling content item to receive the first haptic input from the user computing device such that the first haptic input causes the dynamically scrolling content item to scroll perpendicularly to the motion of the first haptic input; (g) configuring the dynamically scrolling content item to receive the first haptic input from the user computing device such that the first haptic input causes the dynamically scrolling content item to scroll in a rate corresponding to the rate of scrolling of the first online publication; (h) serving the dynamically scrolling content item within the slot of the vertically scrolling online publication such that the dynamically scrolling content item is displayed extending beyond a horizontal border of the vertically scrolling publication; (i) serving the dynamically scrolling content item within the slot of the vertically scrolling online publication such that the slot remains in a fixed location on the user computing device; U) retrieving the dynamically scrolling content item including at least two visual content elements; (k) serving the at least two visual content elements within the slot of the vertically scrolling online publication; (l) receiving a first online publication configured to display in a vertically scrolling format, wherein the first online publication includes at least one slot for serving online content, wherein the first online publication is configured to be navigated based on a first haptic input with the user computing device; (m) presenting a dynamically scrolling content item within the at least one slot; (n) receiving the first haptic input at the first online publication; and (o) scrolling vertically through the first online publication and horizontally through the dynamically scrolling content item based on the first haptic input.

Technical effects of the methods and systems described herein may include: (a) enhanced display of the dynamically scrolling content item, (b) improved display of online content because of the alternative display technique of scrolling online content perpendicularly to the axis of scrolling online publications; (c) faster navigation through online content items and faster access of users to information such as online publications because users may more efficiently scroll through online content that is not of interest; and (d) increased accuracy in detection of intentional interactions with online content caused by a reduced amount of unintended interaction with online content due to the enhanced display of the dynamically scrolling content item.

Described herein are computer systems such as content serving computing devices, user computing devices, and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL. IBM® DB2. Microsoft® SQL Server, Sybase®, and PostgreSQL. However, any database may be used that enables the systems and methods described herein.

(Oracle is a registered trademark of Oracle Corporation, Redwood Shores, Calif.; IBM is a registered trademark of International Business Machines Corporation. Armonk. N.Y.; Microsoft is a registered trademark of Microsoft Corporation, Redmond, Wash.; and Sybase is a registered trademark of Sybase, Dublin. Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond. Wash.). In yet another embodiment, the system is run on a mainframe environment and a UNIX® server environment (UNIX is a registered trademark of X/Open Company Limited located in Reading. Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (N VRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

FIG. 1 is a diagram depicting an example online content environment 100. Online content environment 100 may be used in the context of serving online advertisements to a user, including a user of a mobile computing device, in combination with online publications. With reference to FIG. 1, example environment 100 may include one or more advertisers 102 (i.e., online content providers), one or more publishers 104, an online content management system (OCMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content. OCMS 106 may also be referred to as a content management system 106.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to as sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one or more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, and/or maintain ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. "Publishers." in particular, include authors of content, wherein authors may be individual persons, or, in the case of works made for hire, the proprietor (s) who hired the individual(s) responsible for creating the online content. The term "content" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed publications, or any other form of information that may be presented to a user using a computing device such as one of user access devices 108.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other content providers. One or more of the publishers 104 may represent a content network that is associated with the OCMS 106.

The publishers 104 may receive requests from the user access devices 108 or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with additional sets of content, for example ads, that are related or relevant to the retrieved content for display to users 150, 152, and 154. As discussed further below, these relevant ads may be provided from the OCMS 106 and may be combined with content for display to users 150, 152, and 154. In some examples, the publishers 104 may retrieve content for display on a particular user access device 108 and then forward the content to the user access device 108 along with code that causes one or more ads from the OCMS 106 to be displayed to the user 150, 152, or 154. As used herein, user access devices 108 may also be known as customer computing devices 108. In other examples, the publishers 104 may retrieve content, retrieve one or more relevant ads (e.g., from the OCMS 106 or the advertisers 102), and then integrate the ads and the article to form a content page for display to the user 150, 152, or 154.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The OCMS 106 manages ads and provides various services to the advertisers 102, the publishers 104, and the user access devices 108. The OCMS 106 may store ads in an ad repository 126 and facilitate the distribution or selective provision and recommendation of ads through the environment 100 to the user access devices 108. In some configurations, the OCMS 106 may include or access functionality associated with managing online content and/or online advertisements, particularly functionality associated with serving online content and/or online advertisements to mobile computing devices.

The OCMS 106 may include one or more data processing systems 116, such as servers or embedded systems, coupled to the network 110. It can also include one or more processes, such as server processes. In some examples, the OCMS 106 may include an online content serving system 120 and one or more backend processing systems 118. As described herein, online content serving system 120 may also function as a content serving computing device or alternately be in communication with a content serving computing device (not shown). The online content serving system 120 may include one or more data processing systems 116 and may perform functionality associated with delivering ads to publishers or user access devices 108. The backend processing systems 118 may include one or more data processing systems 116 and may perform functionality associated with identifying relevant ads to deliver, processing various rules, performing filtering processes, generating reports, maintaining accounts and usage information, and other backend system processing. The OCMS 106 can use the backend processing systems 118 and the online content serving system 120 to selectively recommend and provide relevant ads from the advertisers 102 through the publishers 104 to the user access devices 108.

The OCMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The OCMS 106 may include one or more interface or frontend modules for providing the various features to advertisers, publishers, and user access devices. For example, the OCMS 106 may provide one or more publisher front-end interfaces (P as) for allowing publishers to interact with the OCMS 106. The OCMS 106 may also provide one or more advertiser front-end interfaces (AFEs) for allowing advertisers to interact with the OCMS 106. In some examples, the front-end interfaces may be configured as web applications that provide users with network access to features available in the OCMS 106.

The OCMS 106 provides various advertising management features to the advertisers 102. The OCMS 106 advertising features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The OCMS 106 may allow the advertisers 102 to create ads and input keywords or other ad placement descriptors for which those ads will appear. In some examples, the OCMS 106 may provide ads to user access devices or publishers when keywords associated with those ads are included in a user request or requested content. The OCMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. Other actions include haptic feedback or gyroscopic feedback to generate a click-through. The advertisers 102 may also choose a currency and monthly budget.

The OCMS 106 may also allow the advertisers 102 to view information about ad impressions, which may be maintained by the OCMS 106. The OCMS 106 may be configured to determine and maintain the number of ad impressions relative to a particular website or keyword. The OCMS 106 may also determine and maintain the number of click-throughs for an ad as well as the ratio of click-throughs to impressions.

The OCMS 106 may also allow the advertisers 102 to select and/or create conversion types for ads. A "conversion" may occur when a user consummates a transaction related to a given ad. A conversion could be defined to occur when a user clicks, directly or implicitly (e.g., through haptic or gyroscopic feedback), on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The OCMS 106 may store conversion data and other information in a conversion data repository 136.

The OCMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The OCMS 106 may provide various features to the publishers 104. The OCMS 106 may deliver ads (associated with the advertisers 102) to the user access devices 108 when users access content from the publishers 104. The OCMS 106 can be configured to deliver ads that are relevant to publisher sites, site content, and publisher audiences.

In some examples, the OCMS 106 may crawl content provided by the publishers 104 and deliver ads that are relevant to publisher sites, site content and publisher audiences based on the crawled content. The OCMS 106 may also selectively recommend and/or provide ads based on user information and behavior, such as particular search queries performed on a search engine website, or a designation of an ad for subsequent review, as described herein, etc. The OCMS 106 may store user-related information in a general database 146. In some examples, the OCMS 106 can add search services to a publisher site and deliver ads configured to provide appropriate and relevant content relative to search results generated by requests from visitors of the publisher site. A combination of these and other approaches can be used to deliver relevant ads.

The OCMS 106 may allow the publishers 104 to search and select specific products and services as well as associated ads to be displayed with content provided by the publishers 104. For example, the publishers 104 may search through ads in the ad repository 126 and select certain ads for display with their content.

The OCMS 106 may be configured to selectively recommend and provide ads created by the advertisers 102 to the user access devices 108 directly or through the publishers 104. The OCMS 106 may selectively recommend and provide ads to a particular publisher 104 (as described in further detail herein) or a requesting user access device 108 when a user requests search results or loads content from the publisher 104.

In some implementations, the OCMS 106 may manage and process financial transactions among and between elements in the environment 100. For example, the OCMS 106 may credit accounts associated with the publishers 104 and debit accounts of the advertisers 102. These and other transactions may be based on conversion data, impressions information and/or click-through rates received and maintained by the OCMS 106.

As described herein, OCMS 106, elements 112, 114, and/or 116 may substantially allow for the mixing and merging of online content items (including dynamically scrolling content items) and online publications. In conjunction with applications (e.g., mobile applications and mobile web browsers), online content items and online publications may be merged to allow for the perpendicular display of online content items in slots of online publications. Further, such systems 106, 112, 114, 116 and/or applications may facilitate the perpendicular scrolling of online content items in response to user input to scroll online publications.

"Computing devices", for example user access devices 108, may include any devices capable of receiving information from the network 110. The user access devices 108 could include general computing components and/or embedded systems optimized with specific components to performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single OCMS 106 and may include any number of integrated or distributed OCMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
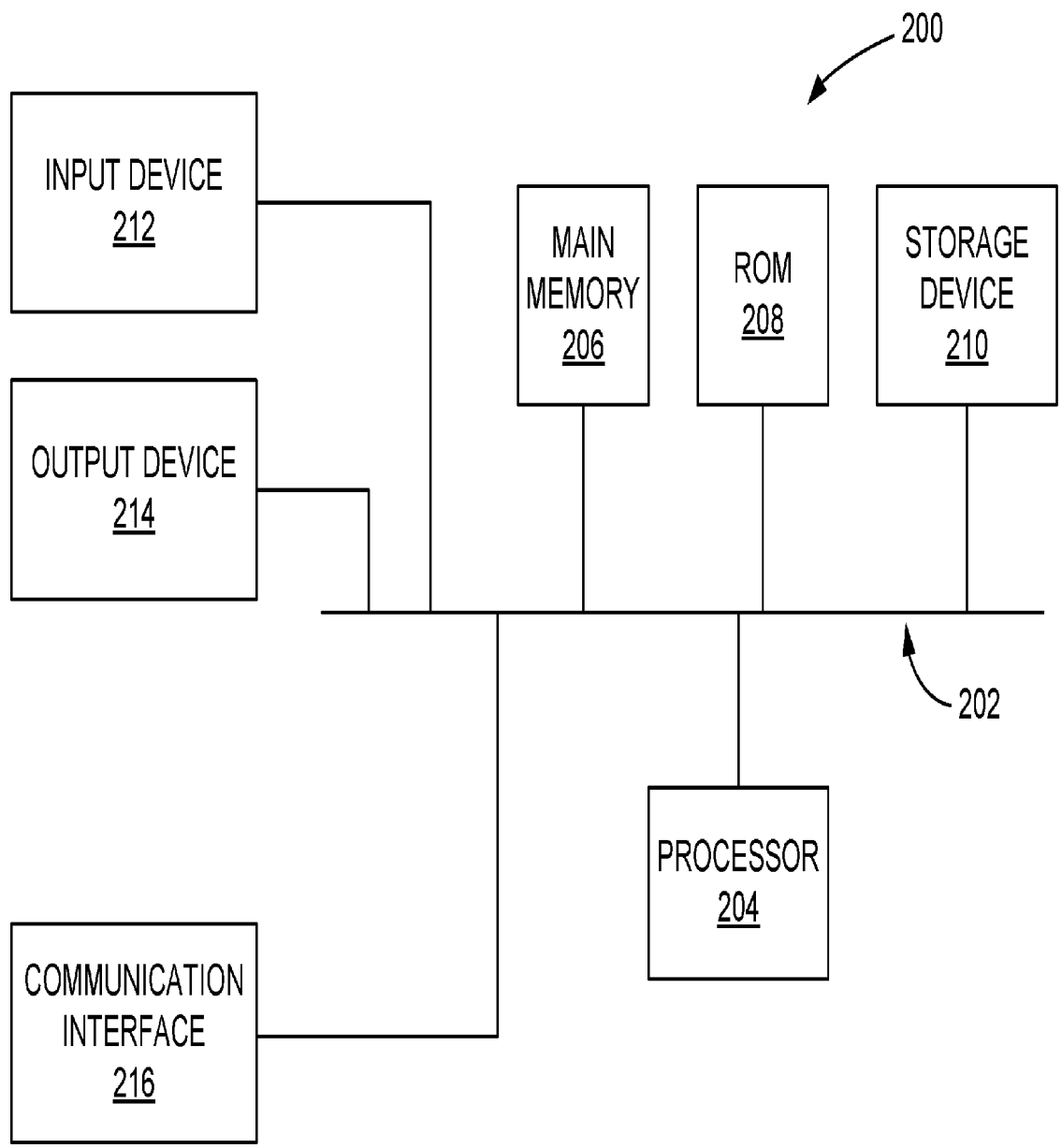
FIG. 2 is a block diagram of a computing device used for providing dynamically scrolling online content within a vertically scrolling online publication to a user device, as shown in the online content environment of FIG. 1.

FIG. 2 is a block diagram of a computing device 200 used for providing dynamically scrolling online content within a vertically scrolling online publication to a user device, as shown in the online content environment 100 (shown in FIG. 1).

FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document. In the example embodiment, computing device 200 may represent content serving computing device 200, described herein.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206. ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB. Bluetooth. Ethernet, wireless Ethernet) may be coupled to one or more input/output devices, such as a keyboard, a pointing device, a scanner, or a networking device such as a switch or router. e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206. ROM 208, an input device 212, an output device such as a display 214, a communication interface 216, among other components including, for example, a receiver and a transceiver.

The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
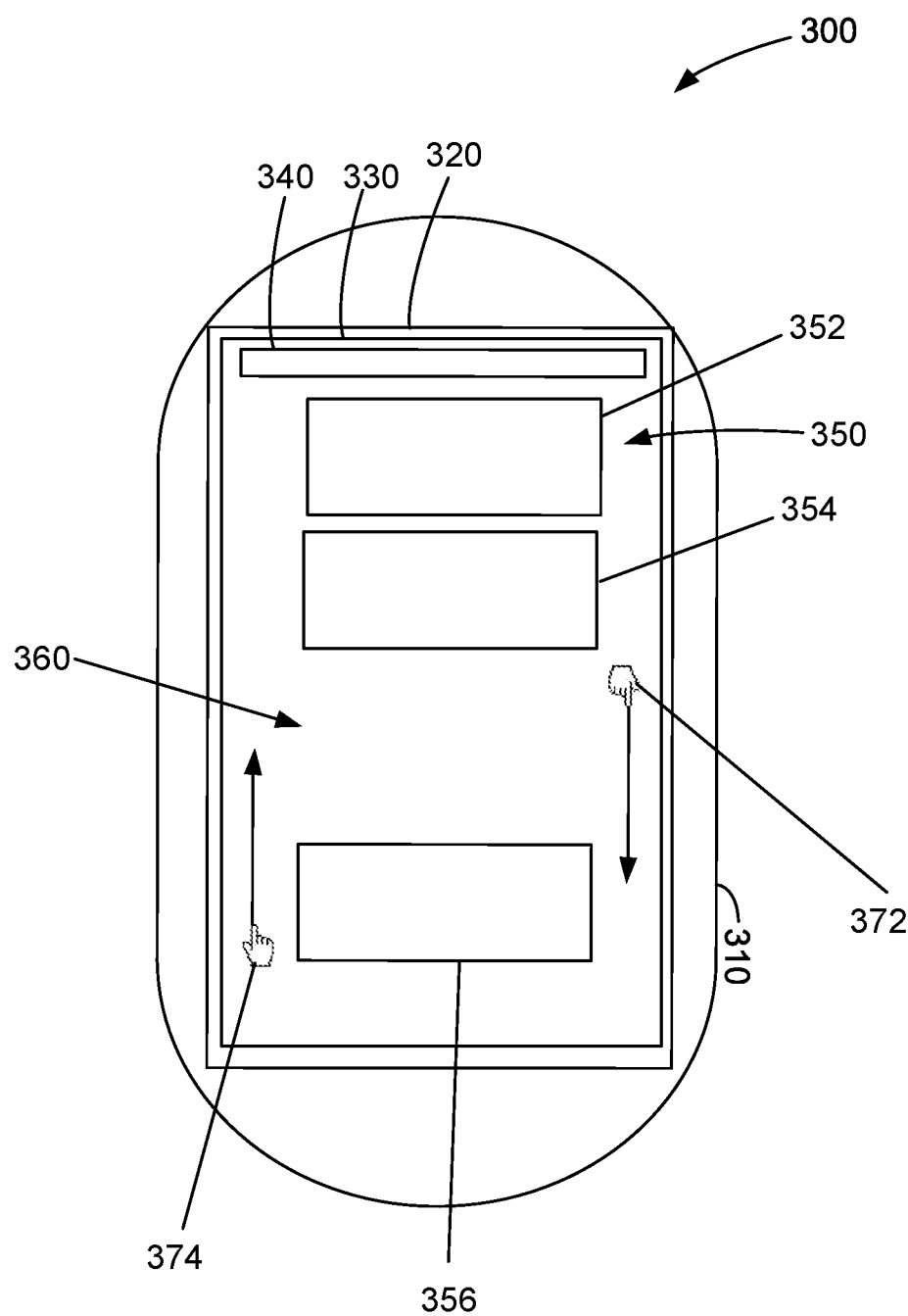
FIG. 3 is a block diagram of a user device used for displaying online content received from the computing device of FIG. 2 within a vertically scrolling online publication.

FIG. 3 is an example mobile computing device 310 displaying content, including online publication 350, which may be automatically served with dynamically scrolling content items, using computing device 200 (shown in FIG. 2) in online content environment 100 (shown in FIG. 1). In the example embodiment, mobile computing device 310 is a smart phone such as user access device 108 used by user 154 (shown in FIG. 1). In alternative embodiments, mobile computing device 310 may include, without limitation, a. smart phone, a personal digital assistant, a computer tablet, a hybrid phone/computer tablet ("phablet"), or other similar mobile device capable of communicating to the web. In the example embodiment, mobile computing device 310 also includes a microphone and speakers (not shown) for telephonic communication, recording, and audio playback.

Mobile computing device 310 includes a mobile computing device display 320. Mobile computing device display 320 is a touchscreen display. Mobile computing device display 320 is configured to display visual information including, without limitation, text, graphics, animation, video, applications, games, and any other visual information which can be displayed on mobile computing device 310. Mobile computing device display 320 is also configured to receive haptic (e.g., tactile) input from a user such as user 154 (shown in FIG. 1). Haptic input refers to input which can be provided by user 154 interacting with a device through tactile interaction. Mobile computing device 310 is further capable of transmitting haptic output or haptic feedback wherein user 154 senses output which may be detected through tactile interaction including, for example, vibration.

Mobile computing device display 320 displays information using mobile application 330. In the example embodiment, mobile application 330 is a news feed application capable of displaying online publication content 350 received from an online publication resource 340. Online publication content 350 may include content elements 352, 354, and 356. In the example embodiment, online publication content 350 is a feed of news and content elements 352, 354, and 356 are news stories. In other embodiments, mobile application 330 may be, without limitation, a mobile web browser, an electronic reader, a web application, a mobile web game, or any other application which is configured to display online publication content 350. Mobile application 330 may be stored in a memory device of mobile computing device 310 and run from a processor of mobile computing device 310. Mobile application 330 may be written in any program language suitable for development with mobile computing device 310.

Online publication resource 340 indicates the Internet or network resource which serves online publication content 350. In the example embodiment, online publication content 350 is a publication from an Internet news publisher. In alternative embodiments, online publication content 350 may be, without limitation, text, graphics, video, animation, games, or any other online publication content 350 which may be served using mobile application 330. In some examples, online publication resource 340 may not be provided or viewable to a user 154.

As used herein, "online publication request" refers to a request initiated by mobile computing device 310 which requesting data associated with an online publication to be delivered to mobile computing device 310. Such data is at least partially represented by online publication content 350. In some cases, additional content is delivered to mobile computing device 310 and not initially displayed.

Mobile application 330 includes slot 360 for serving dynamically scrolling content items (not shown in FIG. 3). Mobile application 330 may be navigated by user 154 using any suitable gesture including haptic gestures 372 and 374. Haptic gesture 372 is an upward swipe that that causes online publication content to move "upwards" while haptic gesture 374 is a downward swipe that causes online publication content to move "downwards".

Figure 4:
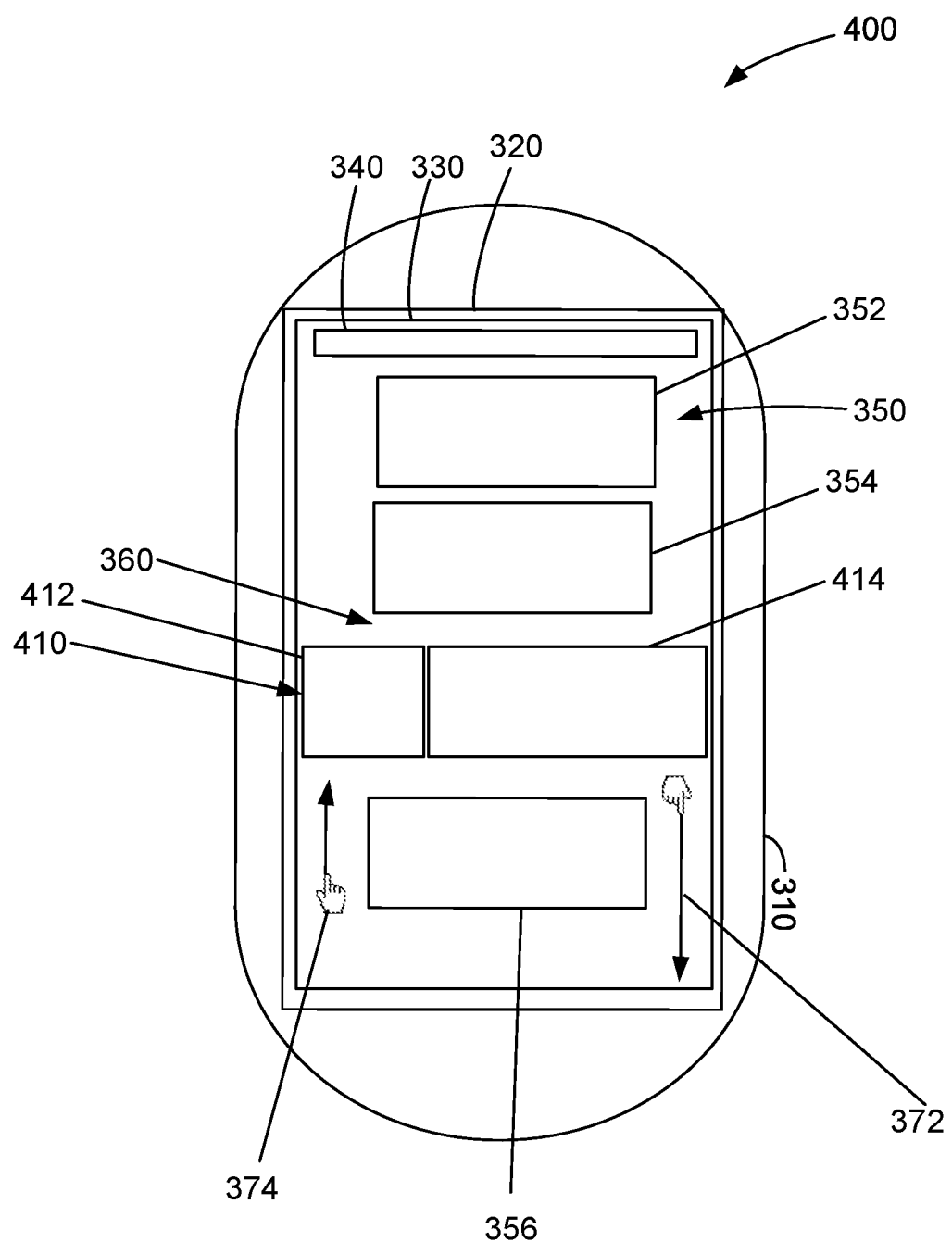
FIG. 4 is a block diagram of a user device displaying online content received from the computing device of FIG. 2 within a vertically scrolling online publication.

FIG. 4 is a block diagram of user device 310 displaying online content 410 received from content serving computing device 200 (shown in FIG. 2) within vertically scrolling online publication 350. As described in FIG. 3, online publication 350 is served with a plurality of publication elements 352, 354, 356 and other elements (not shown) off screen that may be viewable by scrolling upwards or downwards. Further, as described herein, online publication 350 includes at least one slot 360 wherein dynamically scrolling content item 410 may be served. As described herein, dynamically scrolling content item 410 includes a plurality of graphical elements such as graphical element 412 and 414.

As described above and herein, mobile application 330 is configured to associate inputs such as haptic gestures 372 and 374 to navigate through dynamically scrolling content item 410. Further, as described, online content item 410 scrolls in a perpendicular manner with respect to the scrolling of online publication 350. Specifically, in FIG. 4, dynamically scrolling content item 410 scrolls horizontally while online publication 350 scrolls vertically. In alternative examples, dynamically scrolling content item 410 may scroll vertically while online publication 350 scrolls horizontally. Further, as described herein, while mobile application 330 is configured to display online publication 350 with offsets from the edges of mobile computing device display 320, dynamically scrolling content item 410 is displayed to extend beyond such margins. Accordingly, dynamically scrolling content item 410 is more visually apparent without such offsets.

When a user (such as user 154) navigates through online publication 350 using haptic inputs 372 and 374, mobile application 330 is configured to scroll online publication 350 and dynamically scrolling content item 410 in a manner responsive to such haptic inputs 372 and 374. For example, when user 154 provides an input of a downward haptic swipe 372, mobile application 330 may be configured to scroll online publication 350 downward and to also scroll dynamically scrolling content item 410 rightward. Also, as described herein, the velocity of scrolling online publication 350 and dynamically scrolling content item 410 may be determined based on the velocity of inputs such as haptic inputs 372 and 374. Further, the velocity of scrolling dynamically scrolling content item 410 may be determined at least partially based on the widths of dynamically scrolling content item 410 and mobile computing device 310.

Figure 5:
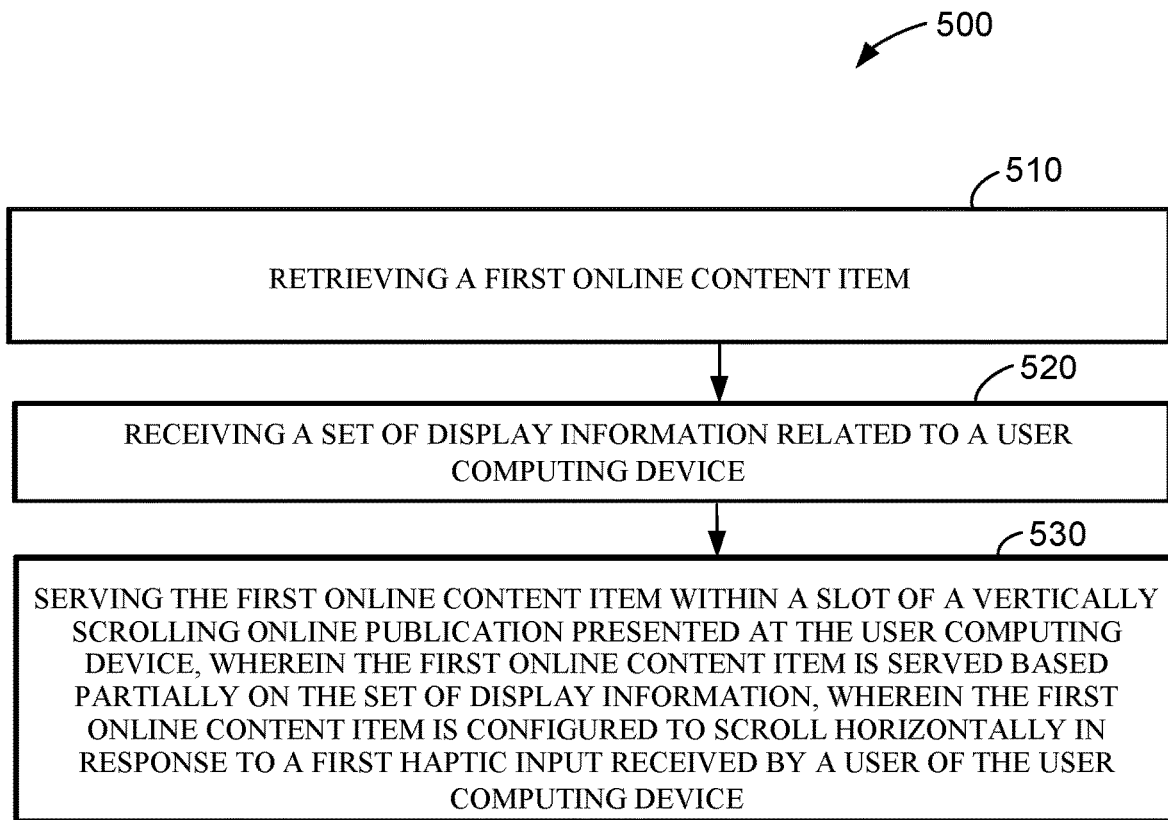
FIG. 5 is an example method of providing online content within a vertically scrolling online publication to the user device of FIGS. 3 and 4 using the online content environment of FIG. 1.

FIG. 5 is an example method of providing online content within a vertically scrolling online publication to the user device of FIGS. 3 and 4 using the online content environment of FIG. 1. Content serving computing device 200 retrieves 510 a dynamically scrolling content item. In an example embodiment, retrieving 510 represents content serving computing device retrieving a dynamically scrolling content item 410 including at least two graphical elements 412 and 414 (all shown in FIG. 4). Content serving computing device 200 may retrieve dynamically scrolling content item 410 from any suitable location including, to example, OCMS 106 and advertisers 102.

Content serving computing device 200 also receives 520 a set of display information related to a user computing device. Receiving 520 represents content serving computer device 200 receiving information related to the display of online publication 350 on user computing device 310 (both shown in FIG. 3).

Content serving computing device 200 additionally serves 530 the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device. Serving represents content serving computing device 200 providing dynamically scrolling content item 410 within slot 360 (shown in FIG. 3) on user computing device 310 such that the dynamically scrolling content item 410 is displayed based on information received 520 and such that the dynamically scrolling content item 410 scrolls in a manner perpendicular to the scrolling of online publication 350 based on an input such as user input 372 and 374 (all shown in FIG. 3).

Figure 6:
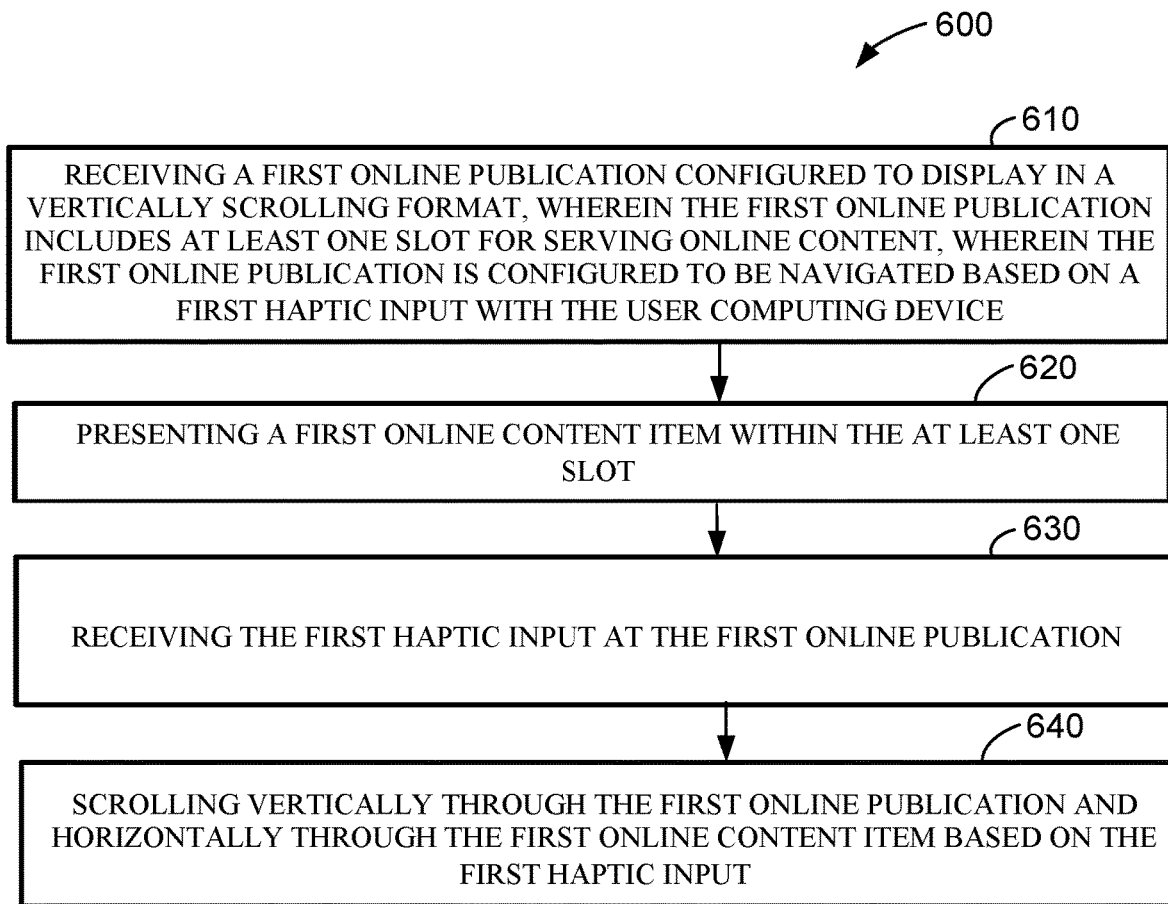
FIG. 6 is an example method of displaying online content received from the computing device of FIG. 2 within a vertically scrolling online publication using the user device shown in FIGS. 3 and 4.

FIG. 6 is an example method of displaying online content received from content serving computing device 200 (shown in FIG. 2) within a vertically scrolling online publication using a user computing device such as mobile computing device 310 (shown in FIG. 3).

Mobile computing device 310 is configured to receive 610 a first online publication configured to display in a vertically scrolling format, wherein the first online publication includes at least one slot for serving online content, wherein the first online publication is configured to be navigated based on a first haptic input with the user computing device. Receiving 610 represents mobile computing device 310 receiving online publication 350 within mobile application 330 to be displayed in a vertically scrolling format such that haptic inputs 372 and 374 cause online publication 350 to scroll vertically. Further, receiving 610 represents mobile computing device 310 including slot 360 for displaying dynamically scrolling content item 410.

Mobile computing device 310 is also configured to present 620 a dynamically scrolling content item within the at least one slot. Presenting 620 represents mobile computing device 310 showing dynamically scrolling content item 410 (shown in FIG. 4) within slot 360.

Mobile computing device 310 is further configured to receive 630 the first haptic input at the first online publication. Receiving 630 represents mobile computing device 310 receiving an input such as haptic inputs 372 and 374 (shown in FIG. 3).

Mobile computing device 310 is also configured to scroll 640 vertically through the first online publication and horizontally through the dynamically scrolling content item based on the first haptic input. Scrolling 640 represents mobile computing device 310 scrolling online publication 350 vertically and dynamically scrolling content item 510 horizontally.

Figure 7:
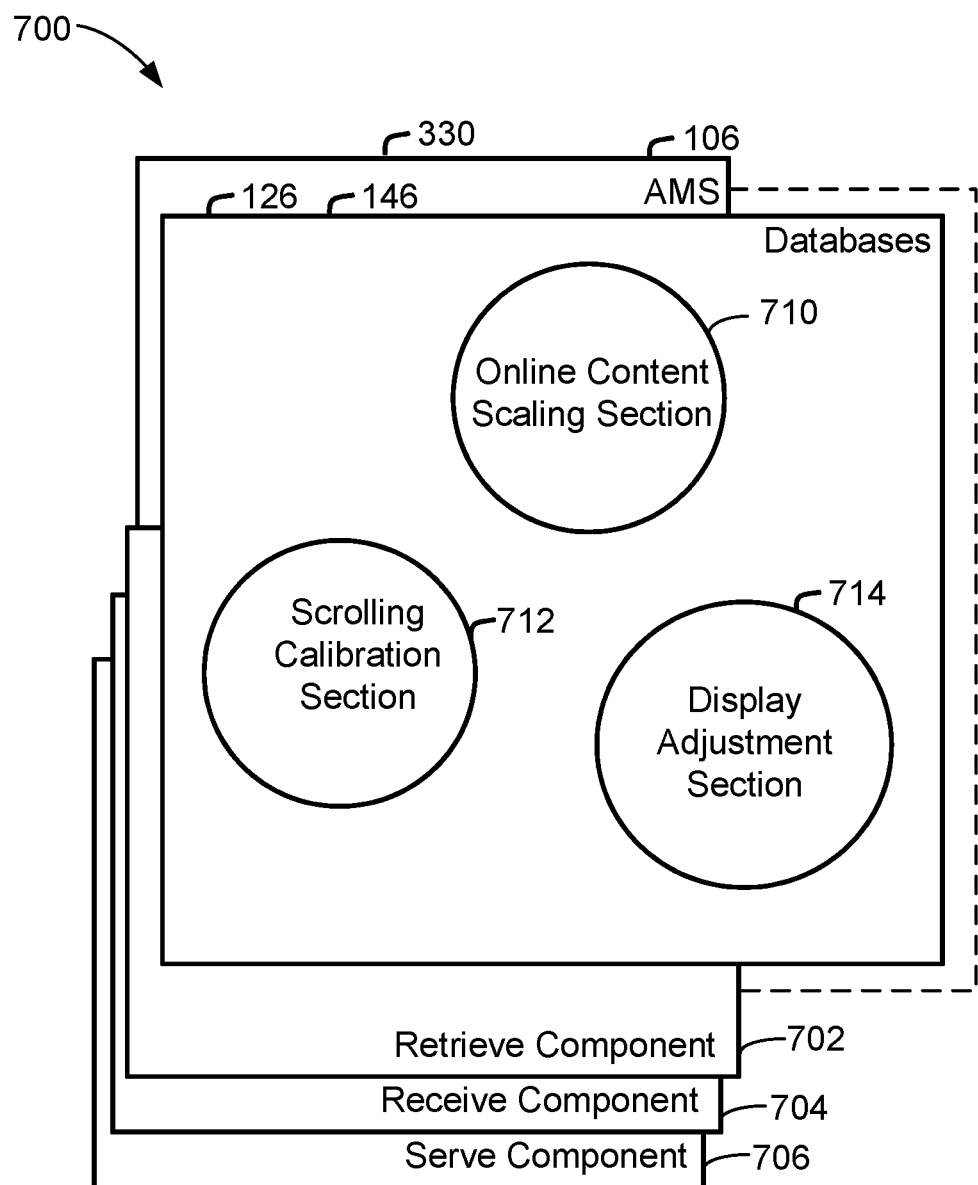
FIG. 7 is a diagram of components of one or more example computing devices, for providing online content within a vertically scrolling online publication using the online content environment of FIG. 1.

FIG. 7 is a diagram of components of one or more example computing devices, for providing online content within a vertically scrolling online publication using the online content environment of FIG. 1.

For example, one or more of computing devices 200 may form advertising management system (OCMS) 106, customer computing device 108 (both shown in FIG. 1), content serving computing device 200 (shown in FIG. 2), and mobile computing device 310 (shown in FIG. 3). FIG. 7 further shows a configuration of databases 126 and 146 (shown in FIG. 1). Databases 126 and 146 are coupled to several separate components within content serving computing device 200, content provider data processing system 112, customer computing device 108, and mobile computing device 310, which perform specific tasks.

Content serving computing device 200 includes a retrieving component 702 for retrieving a dynamically scrolling content item. Content serving computing device 200 additionally includes a receiving component 704 for receiving a set of display information related to a user computing device. Content serving computing device additionally includes a serving component 706 for serving the dynamically scrolling content item within a slot of a vertically scrolling online publication presented at the user computing device, wherein the dynamically scrolling content item is served based partially on the set of display information, wherein the dynamically scrolling content item is configured to scroll horizontally in response to a first haptic input received by a user of the user computing device.

In an exemplary embodiment, databases 126 and 146 are divided into a plurality of sections, including but not limited to, an online interaction online content scaling section 710, scrolling calibration section 712, and display adjustment section 714. These sections within database 126 and 146 are interconnected to update and retrieve the information as required.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for providing scrolling content within an online publication implemented by a content serving computing device, the computer-implemented method comprising:
   transmitting, to a user computing device, scrolling content for presentation on the online publication, wherein the online publication comprises a plurality of publication elements and a region located within the online publication, and wherein the scrolling content comprises a plurality of graphical elements; and
   wherein the user computing device implements an application that causes a user interface of the user computing device to:
      in response to a first haptic input in a vertical direction, scroll through the plurality of publication elements within the online publication in the vertical direction,
      as the plurality of publication elements are scrolled through in the vertical direction, move the region of the online publication to a fixed location, wherein a portion of the plurality of graphical elements is presented within the region,
      within the region of the online publication at the fixed location, indicate that the plurality of graphical elements extend beyond at least one physical horizontal boundary of the user computing device such that viewing the plurality of graphical elements in their entirety requires user interaction, and
      in response to a second haptic input in a horizontal direction, scroll through the plurality of graphical elements in the horizontal direction within the region of the online publication.

2. The computer-implemented method of claim 1, wherein the user computing device implements the application that causes the user interface of the user computing device further to:
   within the region of the online publication at the fixed location, indicate that the plurality of graphical elements extend beyond a horizontal border of the online publication.

3. The computer-implemented method of claim 1, wherein the user interface, within the region of the online publication at the fixed location, indicates a set of borders that offset the online publication from the at least one physical horizontal boundary of the user computing device.

4. The computer-implemented method of claim 3, wherein the user interface, within the region of the online publication at the fixed location, does not indicate an additional set of borders for the plurality of graphical elements.

5. The computer-implemented method of claim 1, wherein each of the plurality of publication elements is selectable to interact with the publication element.

6. The computer-implemented method of claim 1, wherein the second haptic input in the horizontal direction is a swipe in the horizontal direction.

7. The computer-implemented method of claim 1, wherein the application causes the user interface of the user computing device to, in response to the second haptic input in the horizontal direction, not scroll through the plurality of publication elements.

8. A content serving computing device for providing scrolling content within an online publication, comprising:
   a transceiver for communicating with a user computing device;
   a memory storing a set of computer-executable instructions; and
   at least one processor interfacing with the transceiver and the memory, and configured to execute the set of computer-executable instructions to cause the at least one processor to:
      transmit, to the user computing device via the transceiver, scrolling content for presentation on the online publication, wherein the online publication comprises a plurality of publication elements and a region located within the online publication, and wherein the scrolling content comprises a plurality of graphical elements, and
      wherein the user computing device implements an application that causes a user interface of the user computing device to:
         in response to a first haptic input in a vertical direction, scroll through the plurality of publication elements within the online publication in the vertical direction,
         as the plurality of publication elements are scrolled through in the vertical direction, move the region of the online publication to a fixed location, wherein a portion of the plurality of graphical elements is presented within the region,
         within the region of the online publication at the fixed location, indicate that the plurality of graphical elements extend beyond at least one physical horizontal boundary of the user computing device such that viewing the plurality of graphical elements in their entirety requires user interaction, and
         in response to a second haptic input in a horizontal direction, scroll through the plurality of graphical elements in the horizontal direction within the region of the online publication.

9. The content serving computing device of claim 8, wherein the user computing device implements the application that causes the user interface of the user computing device further to:
   within the region of the online publication at the fixed location, indicate that the plurality of graphical elements extend beyond a horizontal border of the online publication.

10. The content serving computing device of claim 8, wherein the user interface, within the region of the online publication at the fixed location, indicates a set of borders that offset the online publication from the at least one physical horizontal boundary of the user computing device.

11. The content serving computing device of claim 10, wherein the user interface, within the region of the online publication at the fixed location, does not indicate an additional set of borders for the plurality of graphical elements.

12. The content serving computing device of claim 8, wherein each of the plurality of publication elements is selectable to interact with the publication element.

13. The content serving computing device of claim 8, wherein the second haptic input in the horizontal direction is a swipe in the horizontal direction.

14. The content serving computing device of claim 8, wherein the application causes the user interface of the user computing device to, in response to the second haptic input in the horizontal direction, not scroll through the plurality of publication elements.

15. A non-transitory computer-readable storage medium having stored thereon a set of instructions, executable by a processor of a content serving computing device, for providing scrolling content within an online publication, the instructions comprising:
    instructions for transmitting, to a user computing device, scrolling content for presentation on the online publication, wherein the online publication comprises a plurality of publication elements and a region located within the online publication, and wherein the scrolling content comprises a plurality of graphical elements; and
    wherein the user computing device implements an application that causes a user interface of the user computing device to:
        in response to a first haptic input in a vertical direction, scroll through the plurality of publication elements within the online publication in the vertical direction,
        as the plurality of publication elements are scrolled through in the vertical direction, move the region of the online publication to a fixed location, wherein a portion of the plurality of graphical elements is presented within the region,
        within the region of the online publication at the fixed location, indicate that the plurality of graphical elements extend beyond at least one physical horizontal boundary of the user computing device such that viewing the plurality of graphical elements in their entirety requires user interaction, and
        in response to a second haptic input in a horizontal direction, scroll through the plurality of graphical elements in the horizontal direction within the region of the online publication.

16. The non-transitory computer-readable storage medium of claim 15, wherein the user computing device implements the application that causes the user interface of the user computing device further to:
    within the region of the online publication at the fixed location, indicate that the plurality of graphical elements extend beyond a horizontal border of the online publication.

17. The non-transitory computer-readable storage medium of claim 15, wherein the user interface, within the region of the online publication at the fixed location, indicates a set of borders that offset the online publication from the at least one physical horizontal boundary of the user computing device.

18. The non-transitory computer-readable storage medium of claim 17, wherein the user interface, within the region of the online publication at the fixed location, does not indicate an additional set of borders for the plurality of graphical elements.

19. The non-transitory computer-readable storage medium of claim 15, wherein each of the plurality of publication elements is selectable to interact with the publication element.

20. The non-transitory computer-readable storage medium of claim 15, wherein the application causes the user interface of the user computing device to, in response to the second haptic input in the horizontal direction, not scroll through the plurality of publication elements.

* * * * *